Figure 4:
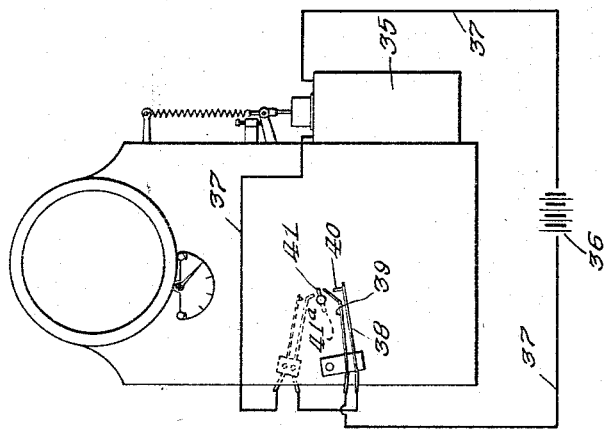
Figure 3:
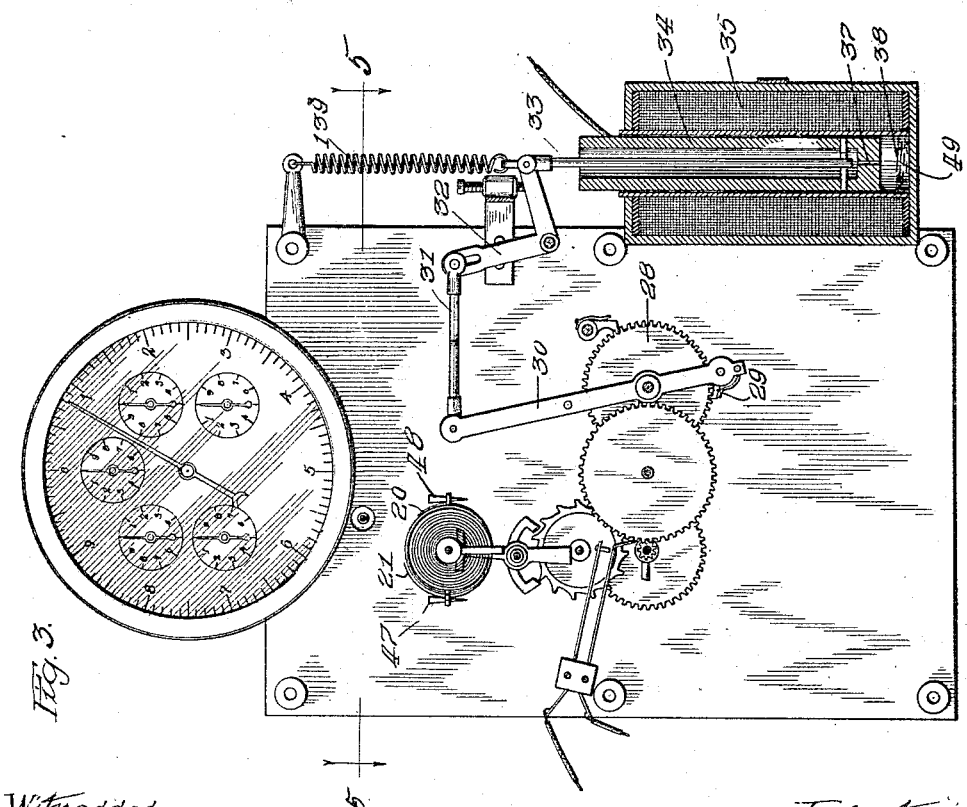
Figure 5:
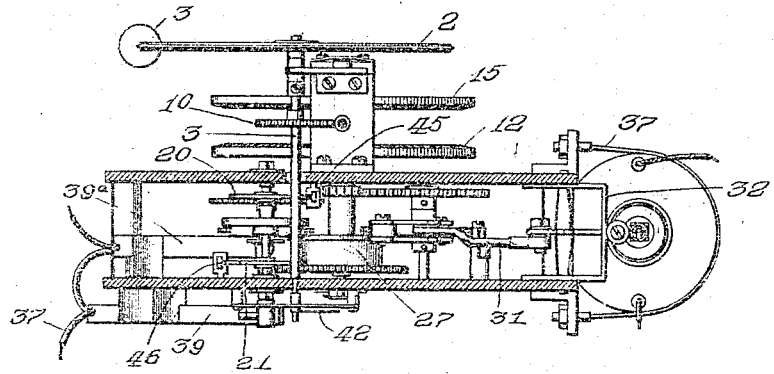

A. DE KHOTINSKY.
INTEGRATING METER.
APPLICATION FILED SEPT. 11, 1914.
1,285,066.
Patented Nov. 19, 1918.
3 SHEETS—SHEET 1.
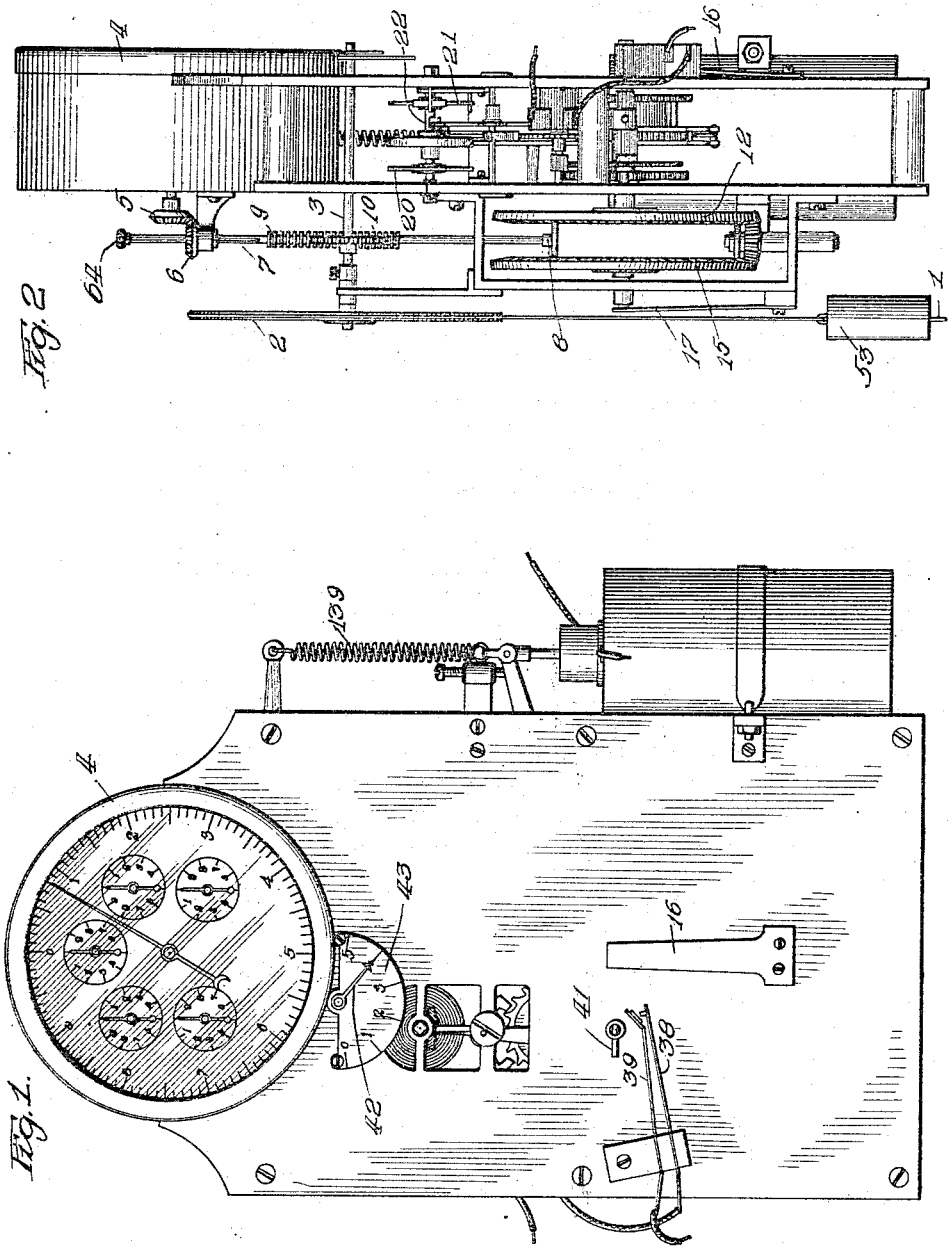
Witnesses:
G. M. Neville
M. M. Boyle
Inventor:
Achilles de Khotinsky
by Lotz & Sheill
Attys.

A. DE KHOTINSKY.
INTEGRATING METER.
APPLICATION FILED SEPT. 11, 1914.

1,285,066.

Patented Nov. 19, 1918.
3 SHEETS—SHEET 2.

Witnesses:
G. M. Neville
M. M. Bayly

Inventor:
Achilles de Khotinsky
by Lotz + Scheible
Attys.

A. DE KHOTINSKY.
INTEGRATING METER.
APPLICATION FILED SEPT. 11, 1914.

1,285,066.

Patented Nov. 19, 1918.
3 SHEETS—SHEET 3.

Witnesses:
G. M. Neville
M. M. Boyle

Inventor:
Achilles de Khotinsky
by Lotz & Scheible
Attys.

UNITED STATES PATENT OFFICE.

ACHILLES DE KHOTINSKY, OF CHICAGO, ILLINOIS.

INTEGRATING-METER.

1,285,066.  Specification of Letters Patent.  Patented Nov. 19, 1918.

Application filed September 11, 1914. Serial No. 861,212.

*To all whom it may concern:*

Be it known that I, ACHILLES DE KHOTINSKY, citizen of the United States, residing at Chicago, in the county of Cook and State of Illinois, have invented certain new and useful Improvements in Integrating-Meters; and I do hereby declare the following to be a full, clear, and exact description of the invention, such as will enable others skilled in the art to which it appertains to make and use the same.

In its more comprehensive aspects my invention relates to a meter for indicating and integrating the amount of liquid flowing through any passage in which the volume of the passing liquid is proportioned to the level thereof, as for example, in a proportional weir, its general objects being to provide a simple and accurate meter of this class actuated by an electrically wound clock-work requiring a small amount of electrical energy for the winding and especially compensated to overcome the effect of temperature changes upon the balance spring action of the clock-work, which clock cannot be stopped by rocking the same and therefore can be depended upon to run without interruption. In its more detailed aspects, the objects of my invention include those of providing an integrating meter with a control rack affording a minimum of friction between it and the parts associated therewith; to provide a positive friction drive for the integrating meter while still permitting a ready sliding of the friction drive members with respect to each other, and to provide simple means of compensating for any irregularities in the surfaces of the friction drive members; to provide means for preventing said compensating from causing a binding of the parts associated therewith; to provide an actuating clock-work with an escapement which will automatically start whenever the actuating spring is wound; to provide balance spring means which will maintain the escapement in a balanced position with respect to the escapement wheel in spite of temperature changes; to provide a simple and positive electrically actuated winding mechanism for a clock-work which will operate with a minimum of jarring, and which will require an unusually small amount of electrical energy; to provide simple means for limiting the time during which current is supplied to the electrical actuating means to exceedingly short time periods, and for readily adjusting the said periods; to provide simple means for retarding the return stroke of the electrically actuated winding means so as to maintain the winding spring under an initial tension for a predetermined length of time; and to provide visual means for indicating the level of the liquid in the said passage, thereby enabling the accuracy of the meter to be readily checked.

In the drawings:

Figure —1— is an elevation of a device embodying my composite invention with a portion of the current-carrying wires and the batteries omitted.

Fig. —2— is a side elevation of the same.

Fig. —3— is a view similar to Fig. 1 but with the front plate of the frame removed and the solenoid in central vertical section.

Fig. —4— is a diagrammatic view of the circuits of the clock-winding mechanism.

Fig. —5— is a horizontal section through Fig. —3— along the line 5—5.

Fig. —6— is an enlarged vertical section through a portion of Fig. —2—.

Figure 6:
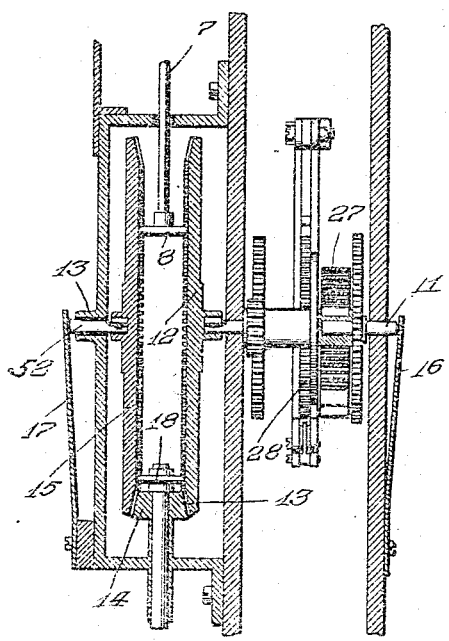

In the embodiment of the drawings, my invention is shown as used in connection with a float (not shown in the drawings) connected to a cord 1 passing over a grooved wheel 2 and drawn taut by a weight 53, the said float being controlled by the level of the liquid which is being metered while flowing through a passage associated with said float. The wheel 2 is carried by a shaft 3 supported by a frame carrying the integrating or counting mechanism 4, which mechanism may be of any one of a number of well-known types. Projecting from the counting mechanism 4 and connected thereto is a bevel gear meshing with a companion gear 6, which latter has a key slidably but non-rotatably engaging a slot in a rack bar 7 extending vertically of the device and equipped at its lower end with a friction wheel 8. Mounted upon the rack-bar 7 is a circular rack 9 having each of its teeth disposed annularly about the axis of the said bar, so that the said teeth will present a rack in every direction axially of the said bar. Meshing with the said rack is a toothed wheel 10 secured to the shaft 3 controlled by the said float. Mounted within the said supporting frame is a clock-work continuously and uniformly rotating a driving shaft 11, which shaft is so mounted as to permit a slight longitudinal sliding thereof in its bearings. Rigidly secured to the rear end of the said shaft is a friction wheel 12 having a highly polished surface and equipped at its periphery with teeth 13 disposed upon a bevel and meshing with a bevel pinion 14 loosely mounted upon the framework of the device. Supported by the said framework substantially in alinement with the driving shaft 11 is an idle shaft 52, which shaft is preferably somewhat smaller in diameter than the bearing 13 carrying the same, so that the said shaft may be tilted with respect to the normally common axis of said shaft and of the drive shaft 11. Secured to the idle shaft 52 is a companion disk 15 also equipped with a highly polished face opposed to the said polished face of the friction disk 12, the said faces of both of said disks bearing against the periphery of the friction wheel 8. The companion friction disk 15 also is equipped at its periphery with teeth meshing with the pinion 14, so that the latter will transmit motion from the disk 12 to the disk 15 to cause the latter to rotate uniformly with the former, but in an opposite direction thereto, thereby enabling the face portions of both of said disks to afford a frictional drive for the wheel 8 and the parts connected thereto. Associated with the frame and bearing against the outer ends of the respective shafts 11 and 52 are springs 16 and 17, which springs continuously press the said shafts toward each other, thereby forcing the said friction disks into forcible engagement with the friction wheel 8. Interposed between the said friction disks and preferably mounted in axial alinement with the pinion 14, but freely rotatable with respect to the latter is a spacer wheel 18 equal in size to the friction wheel 8 and normally coöperating with the springs 16 and 17 to maintain the faces of the friction disks in substantially parallel planes in spite of the loose mounting of the shaft carrying one of said disks. The spacer wheel 18 is of such size as to keep the teeth upon the two disks from bottoming in the teeth on the bevel pinion 14, thereby preventing any excessive friction between the said geared wheels. It will be evident from Fig. —6— that the spacer wheel 18 being equal in diameter to the friction wheel 8 will keep the opposed faces of two friction disks uniformly spaced, so that the friction wheel 8 may be slid up or down with very little effort, thereby making my device extremely sensitive to changes in the controlling member, which in this case is the said float. However, in case of any irregularities in the said surfaces or in the contour of the friction wheel 8, the loose mounting of the shaft 52 will permit a tilting of the opposed faces of the friction disks out of their parallel planes, thereby enabling the springs 16 and 17 to maintain the said friction wheel continuously in operative relation to the friction disks and preventing any relative slipping thereof during the operation of the device. To enable the friction disk readily to respond to such a relative tilting of the friction wheels, I preferably elongate the bearing 44 for the rack-shaft 7 (Fig. 6) in a direction parallel to the driving shaft 11.

While the driving shaft 11 may be propelled by any suitable mechanism affording a uniform speed of rotation, I preferably drive the same by an electrically wound clockwork, as ordinary clocks require a regular rewinding at frequent periods, thereby demanding attention which may not always be feasible when devices of this kind are to be used in scattered places, as for example in metering the water used for irrigation purposes. It will be evident that since the indications of the device depend upon the speed of rotation of the driving shaft 11, the accuracy of these indications will depend upon the degree with which the clock-work keeps good time, thereby making it impractical to use the ordinary clock-mechanisms, as devices of this kind are often used under temperature variations ranging all the way from extreme cold to the high temperatures found in boiler rooms.

Heretofore, it has been customary to control the action of clock escapements by a single balance spring so connected to the escapement that the alternate coiling and uncoiling will oscillate alternately the escapement in opposite directions from the neutral position of the escapement. In practice, I have found that the elongation of the balance spring due to the expansion thereof at temperatures above that at which the clockwork was assembled will tilt the neutral position of the escapement, thereby unbalancing its action on the escapement wheel in one direction; and likewise, the contracting of the spring in cold weather will unbalance the action in an opposite direction. To overcome this, I substitute for the usual single balance spring a pair of springs 20 and 21 (preferably exact duplicates of each other) coiled in opposite directions and so connected to the balance wheel shaft (and hence to the escapement) that the escapement will be in its neutral position when both springs are at rest. This connecting is easily effected by securing the inner ends of both springs to the shaft 22 of the balance wheel while the outer end portions of the springs extend loosely respectively through eyes 45 and 46 fast upon the frame work of the clock, holding the escapement in its neutral or central position and then fastening the springs respectively to the said eyes by wedges 47 and 48. It will be evident that any temperature changes will affect both springs alike, so that the resulting expansion or contraction of the springs will not shift the neutral line of the escapement but will still preserve a balanced action of the latter. Consequently, I am able to produce a simple clock which will be unusually uniform in its time-keeping in spite of wide ranges in the temperatures to which it may be exposed.

Instead of depending upon a key-wound spring for actuating the clock-work and thereby also introducing the error in the time kept by the clock due to the irregular tension of the spring when wound at different intervals, I preferably drive the clock-work by a relatively short spring 27 associated with a ratchet wheel 28 which is wound at intervals through the action of a ratchet pawl 29 carried by a lever 30. Connected to the said lever through suitable means such as a link 31, a bell crank lever 32 and a piston rod 33 is a hollow plunger 34 forming the core of a solenoid, the solenoid having its winding 35 connected to a battery 36 through a circuit and a pair of circuit closers which will be described hereafter. The plunger 34 is preferably hollow and equipped at its lower end with a relatively fine bore 37 leading to the lower end of the tube 38 in which the said core reciprocates. When the magnet is energized by the passage of current through the winding 35, the core 34 will be quickly drawn into the said tube, thereby actuating the lever 30 and the ratchet wheel 28 and winding the spring 27 connected to the latter. However, in thus descending, the lower end of the core 34 will impinge against oil 49 stored in said tube, thereby checking the downward movement of the plunger while the oil is gradually passing through a fine tube 37 into the bore of the plunger itself. Likewise, when the current is interrupted and the core is drawn upward by a spring 139 connected to the frame-work of the device, the said upward motion of the core will produce a partial vacuum in the tube 38, whereupon the downward pressure of the external air will check any rapid upward movement of the plunger and will permit this to move only as rapidly as the oil within the hollow plunger can enter through the tube 37 to reduce the said vacuum. Consequently, no sudden or slamming action will be produced by the movement of the core in either direction, so that I am able to use relatively delicate adjustments and mountings for the clockwork without danger of their being deranged by the electrical operating mechanism.

While such an actuating magnet may be controlled by any circuit-closing means actuated at intervals by the clock-work, I preferably equip the latter with a differentially acting pair of circuit-closers so arranged as to reduce the time during which the circuit is closed to very short periods. In using the circuit closers heretofore applied for this purpose, I have found that a large portion of the energy of the battery or other source of current supply is wasted by flowing through the magnet after the latter has been sufficiently energized to move the core for the full extent of its travel; I have also found that this excess of time is particularly wasteful of energy as the resistance offered to the flow of the current by the winding of the magnet falls off rapidly after the winding has reached its maximum of self-induction. To avoid this waste, I connect the battery 36 to the winding 35 of the magnet through a circuit 37 having two circuit-closers connected in series with each other. Each of these circuit-closers in the embodiment of the drawings comprises a pair of contacts 38 and 39, one thereof equipped with a contact tip 40 adapted to engage the other thereof when the said contact members are pressed toward each other by suitable means such as a pin 41 rotated by the clock-work. The two pins 41 and 41$^a$ thus actuating the respective pairs of contacts to close the circuit through the same are preferably so disposed that they will close the circuit through one pair of contacts just before opening the circuit through the other pair, so that the circuit will be closed only for the overlapping period of time and not during the much longer period involved by the wiping engagement of one of the said pins with the contact adjacent thereto. By adjusting the relative positions of the said pressure pins 41 and 41$^a$ I can readily vary the time during which the circuit is actually closed, so as to reduce this to a period of time not greater than, and preferably shorter than, the time which it takes the winding 35 to reach its maximum of self-induction. Consequently, the flow of current through the said winding will always meet the resistance caused by the said self-induction, so that I avoid the many times greater waste of energy due to a continuing of the current flow after the self-induction subsides and while the magnet winding is only offering its ohmic resistance. My experiments have shown that in this way I can easily reduce the required current consumption to one-tenth or one-twentieth of what it would be with circuit-closers of the types heretofore in use.

While the indicator 4 continuously records the total consumption of what is being metered, the position of the float or other member controlling the cord 1 and rack 7 may readily be seen at any moment from a pointer 42 passing over a dial 43 and connected to the shaft 3. Indications of this pointer may also be used in connection with a chronometer for checking the accuracy of the records produced by the device upon the indicator 4.

For example, in order to reduce the friction between the rack-bar 7 and the key carried by the bevel gear 6 through which the said rack bar slides, I preferably substitute for an ordinary key-way in the said bar a slot extending longitudinally entirely through said bar and continuing to the upper end of the latter. Then I thread upon the split upper end of the bar a cap 64 of such dimension as to hold the separate portions of the bar at the proper spacing for enabling them to slide freely upon the said key-way and also to slide freely through the bore of the bevel gear 6.

While I have shown and described my invention as applied to a particular purpose, it will be evident that its indicating and integrating operations will be equally adapted for any other purposes in which the movement of a rack member are in proportion to a given factor of whatever is being metered. Moreover, I do not wish to be limited to the use of each of the novel elements of this invention in its present combination, it being evident that the current-saving, shock-checking and simple actuating features of the electrical mechanism may be applied to electrical clocks of any description, and that the compensating balance-springs and the self-starting escapement likewise may be applied to clock-works of any kind. Neither do I wish to be limited to the precise details of construction herein disclosed, as the latter might be varied in many ways without departing from the spirit of my invention.

I claim as my invention:

1. The combination with a pair of axially substantially alined disks presenting opposed faces in substantially parallel planes, of a friction wheel interposed therebetween and contacting with the opposed faces of the disks, means for continuously forcing both disks against the friction wheel, means associated with one of said disks for permitting the face thereof to tilt out of the said plane, and means disposed between said faces for limiting the said tilting.

2. That combination with a flat-faced disk of a second disk presenting a flat face opposed to and normally parallel to the face of the first named disk, means for simultaneously rotating both disks in opposite directions, a friction wheel interposed between and contacting with the said faces of the two disks, pressure means continuously forcing both disks against the friction wheel, and means associated with said disks for permitting a relative tilting of said disks for bringing the faces thereof out of their said parallelism.

3. The combination with a continuously rotated friction disk, a companion disk opposite to and substantially in axial alinement with said friction disk, mechanism connecting said disks for causing the rotation of the first-named thereof to rotate the other thereof in an opposite direction, a friction wheel and a spacer wheel both interposed between and contacting with the opposed faces of said disks, and pressure means associated with the disks for forcing the opposed faces thereof simultaneously into engagement with both said wheels.

4. The combination with a pair of axially substantially alined disks, of a friction wheel interposed therebetween and contacting with the opposed faces of both disks, means continuously forcing both disks against the periphery of the friction wheel, a gear wheel interposed between the disks and engaging both thereof, a shaft for said gear wheel, means associated with the disks for permitting relative angular displacement of their opposed faces, and a spacer wheel mounted on said shaft and positioned for engaging both disks to limit the said angular displacement.

5. The combination with a support, of a driving shaft and an idle shaft both slidably and rotatably mounted thereon in substantially axial alinement, a friction disk carried by each thereof, mechanism connecting said disks and causing the rotation of one thereof to rotate the other thereof in an opposite direction, a friction wheel interposed between the said disks and contacting with the opposed faces thereof, and pressure means associated with said shafts and tending continuously to slide said shafts toward each other, whereby the said disks are forced into engagement with said wheel, the mounting of said idle shaft permitting a tilting of the latter out of alinement with the driving shaft, thereby allowing a relative tilting of the said opposed faces of the disks.

6. The combination with a support, of a driving shaft and an idle shaft both slidably and rotatably mounted thereon in substantially axial alinement, a friction disk carried by each thereof, each of said disks equipped at its periphery with teeth, a friction wheel and a spacer wheel both disposed between and contacting with the opposed faces of said disks; a toothed wheel associated with said disks and intermeshing the teeth on both of the latter, whereby the rotation of one thereof will rotate the other in an opposite direction; and pressure means associated with said shafts for relatively approaching the same, thereby forcing said disks into engagement with the friction wheel; the spacer wheel and the toothed wheel relatively so proportioned that the engagement of the former with the disks will prevent the teeth on the latter from bottoming with the teeth on the disks.

7. The combination with a support, of a driving shaft and an idle shaft both slidably and rotatably mounted thereon in substantially axial alinement, a friction disk carried by each thereof, each of said disks equipped at its periphery with teeth, a friction wheel and a spacer wheel both disposed between and contacting with the opposed faces of said disks; a toothed wheel associated with said disks and intermeshing the teeth on both of the latter, whereby the rotation of one thereof will rotate the other in an opposite direction; and pressure means associated with said shafts for relatively approaching the same, thereby forcing said disks into engagement with the friction wheel; the spacer wheel and the toothed wheel relatively so proportioned that the engagement of the former with the disks will prevent the teeth on the latter from bottoming with the teeth on the disks, the spacer wheel being in axial alinement with the toothed wheel but freely rotatable with respect to the latter.

In testimony whereof I have signed my name in presence of two subscribing witnesses.

ACHILLES DE KHOTINSKY.

Witnesses:
ALBERT SCHEIBLE,
M. M. BOYLE.

Copies of this patent may be obtained for five cents each, by addressing the "Commissioner of Patents, Washington, D. C."